June 4, 1946.     E. KOEHLER     2,401,570
HYDRAULIC SURGE DAMPER
Filed May 14, 1945
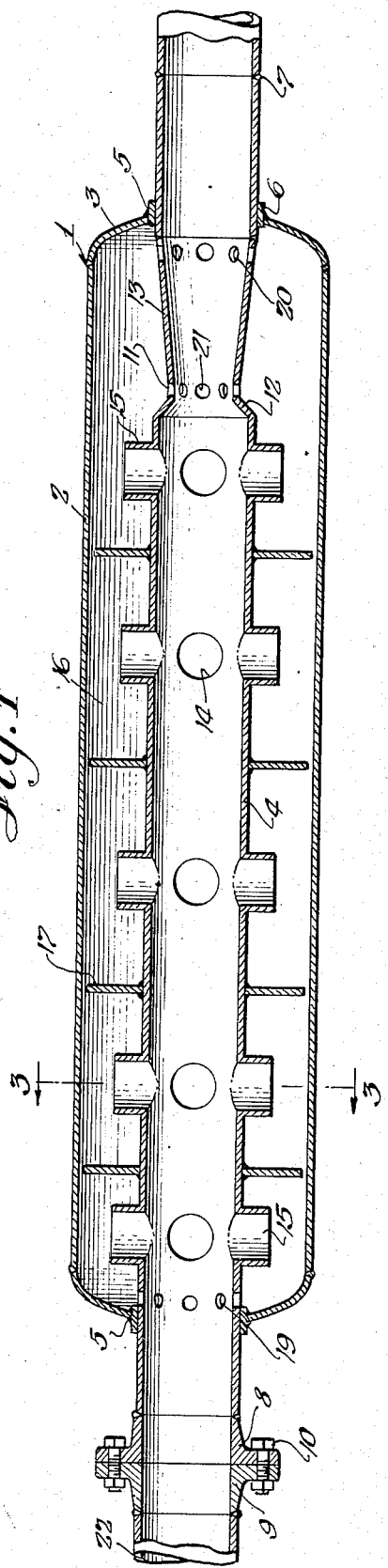
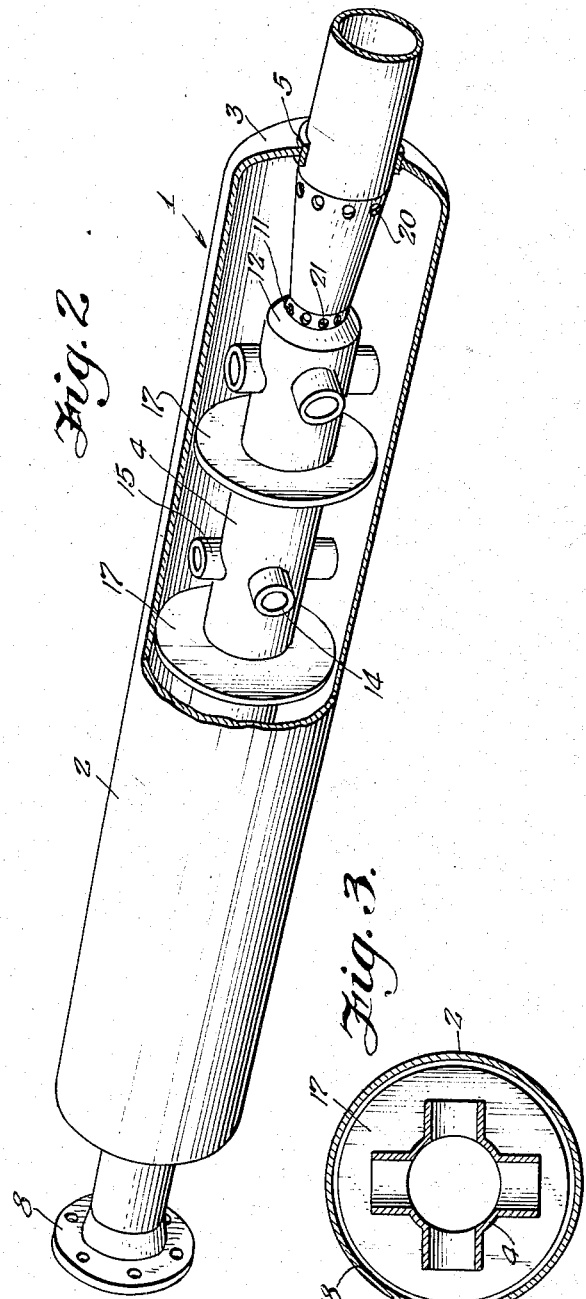
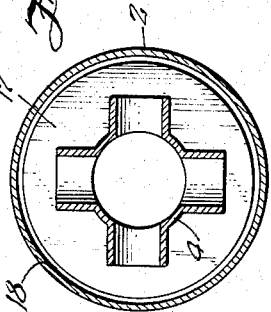
INVENTOR
*Egon Koehler*
BY
*Fishburn & Mullendore*
ATTORNEYS.

Patented June 4, 1946

2,401,570

UNITED STATES PATENT OFFICE 2,401,570

HYDRAULIC SURGE DAMPER

Egon Koehler, Tulsa, Okla.

Application May 14, 1945, Serial No. 593,685

12 Claims. (Cl. 138—26)

This invention relates to a hydraulic surge damper, and more particularly to a device for suppressing fluid pulsations in the pipes of distribution or supply systems.

It is well known that the action of air and most fluids follows established laws of fluid flow when due consideration is given to the relative viscosity, density, and compressibility of the fluid in question. In hydraulic piping systems it is recognized that various pumps set up a series of periodic pressure waves which travel through the medium in the pipes at a velocity equal to the speed of sound in the medium being pumped. The frequency of this periodic wave is a function of the number of pumping impulses per revolution of the pump and the pump speed. These periodic impulses produce a pressure wave of known amplitude and known frequency, at steady-state conditions. These waves are reflected from various elements of the piping, and often the incident and reflected waves combine to form a standing wave of dangerous magnitude. These combined waves have been known to rupture pipes, crack pump cylinders, pistons and valves, and cause considerable damage to various elements of the pipe line.

Mechanical alleviators have been used to reduce these pressure waves, but as they are spring loaded and the piston rod of these alleviators must pass freely through a gland, there are inherent difficulties preventing satisfactory operation. The glands leak if they are sufficiently loose to allow free operation, and if tightened to prevent the leakage, the piston rod has been known to stick in one position without functioning, or to operate in a delayed manner due to the gland friction.

Air chambers are often used to reduce the intensity of these pressure waves, but are inconvenient to maintain as the air chamber must be charged periodically with high pressure air, and hence, requires a source of compressed air, valves, gauges, and high pressure tubing, with the attendant leakage problem. Each of the above devices has several moving parts which require adjustment, replacement or repair at definite intervals.

The principal objects of the present invention are to provide an hydraulic surge damper that may be installed in the discharge or suction pipes of a reciprocating or centrifugal hydraulic pump to eliminate the above noted objections to present-day systems; to provide a device which will prevent vibrations of the pipes of a fluid distribution system due to pressure pulsations of a supply pump used in such system; to provide a device to obtain a smooth steady flow of a fluid in a supply system; to provide a device to reduce wear to the pump and other parts of the system and to reduce to a minimum the repairs of such system; and to provide a simple and economical device for this purpose which will operate in an efficient manner.

In accomplishing these and other objects of the invention, I have provided improved structure, the preferred form of which is illustrated in the accompanying drawing, wherein:

Fig. 1 is a longitudinal sectional view of an hydraulic surge damper embodying the features of my invention, showing its assembly in a piping system.

Fig. 2 is a perspective view of the device with parts broken away to better illustrate the invention.

Fig. 3 is a cross-section taken on line 3—3, Fig. 1.

Referring more in detail to the drawing:

1 designates an hydraulic surge damper comprising an outer shell 2 having rounded or dished heads 3. The heads are welded or otherwise secured to a pipe 4, as indicated at 5, Fig. 1. The outer shell 2 is positioned concentric with the pipe 4 by the dished heads, and if desired, reinforcing rings 6 may be provided around the pipe for fastening of the dished heads thereto by welding or other means, as above stated.

The damper may be welded to a section of pipe, as indicated at 7 at the right-hand end of Fig. 1, but if it is desired to be made removable from a pipe line or the like, it may be composed of a section of pipe having flanged ends 8, shown at the left-hand end of Fig. 1, so that it may be attached to a flanged end 9 of a pipe by bolts or the like 10.

Referring now to the pipe or conduit extending longitudinally of the shell 2, I preferably provide one end thereof with a venturi or throat 11 formed by reducing the end of the main pipe 4, as indicated at 12, and providing the main pipe with a tapered portion 13 to form a divergent cone in the pipe to form the venturi. The pipe 4 is provided with a plurality of openings 14 around the circumference thereof and at spaced intervals along the pipe. Welded or otherwise secured in said openings is a plurality of short pipes 15 which provide communication between the interior of the pipe 4 and the chamber 16 provided between the pipe 4 and the other shell 2. While I do not wish to be limited to any specific number of openings and pipes on the conduit 4, I preferably arrange the openings in series along the pipe and have here shown four openings around the circumference of the pipe in each series. Located between the series of pipes around the conduit 4 and secured thereto by welding or the like are annular discs 17 of a diameter to extend just short of the wall of the shell 2 dividing the chamber 16 into compartments and providing annular orifices 18 between said compartments. The pipe 4 is also provided at its respective ends just inside of the shell 2 with vents 19 and 20, and the venturi 11 is also provided with vents 21 for a purpose later described.

Operation of a device assembled and constructed as described is as follows:

Fluid enters through the end 22 of the device and flows through the pipe 4. As it enters the pipe inside of the dished heads of the shell, some of said fluid will flow through the vents 19 into the surge chamber or compartments 16. This flow of fluid progresses through the annular orifices 18 and will be constrained to rejoin the primary fluid flow in pipe 4 through the vents 21 in the venturi 11. While the majority of the flow of fluid will be directly through pipe 4, a part of the fluid will flow back and forth through the short pipe dampers 15 in the respective compartments to compensate for the pulsations in the line. The fluid flowing through the vents 19 and 20 will assist in cleaning sediment or other material from the areas of the assembly of the device ordinarily not subject to the force of the flow of liquid. The fluid entrained within the damper pipes 15 acts as a mass of finite inertia which is caused to oscillate by the pipe line pressure impulses against the hydraulic spring supplied by the fluid volume of the surge chamber 16. It will be obvious that this oscillating system is capable of being tuned to any driving frequency desired.

It will be obvious from the foregoing that I have provided an improved hydraulic surge damper for preventing pulsations of fluid in a distribution or supply system where pumps are required for flow of the fluid therethrough.

What I claim and desire to secure by Letters Patent is:

1. In a system of the character described, a surge damper comprising, a pipe, a shell rigidly secured to said pipe forming a chamber around said pipe, one end of said pipe being restricted to form a venturi therein, means on said pipe providing communication between the interior of said pipe and said chamber, annular flanges secured to said pipe providing annular orifices in said chamber, and means on said pipe for venting fluid therefrom to said chamber.

2. A surge damper including a central tube, a shell surrounding said tube and having its respective ends rigidly secured to said tube providing a chamber between the walls of said tube and said shell, means on said tube to provide annular orifices in said chamber, and means on said tube providing communication between said tube and said chamber.

3. In a fluid distribution system, a surge damper comprising, a pipe, a shell rigidly secured to said pipe forming a chamber around said pipe, one end of said pipe being restricted to form a venturi therein, means on said pipe providing communication between the interior of said pipe and said chamber, annular flanges secured to said pipe providing annular orifices in said chamber, means on said pipe for venting fluid therefrom to said chamber, and orifices in said pipes at the respective ends of said shell for passage of fluid to the ends of said shell.

4. A surge damper including a central tube, a shell surrounding said tube and having its respective ends rigidly secured to said tube providing a chamber between the walls of said tube and said shell, flanges on said tube to provide annular orifices in said chamber, and means on said tube providing communication between said tube and said chamber.

5. In a fluid supply system, a surge damper comprising, a pipe, a shell rigidly secured to said pipe forming a chamber around said pipe, one end of said pipe being restricted to form a venturi therein, means on said pipe providing communication between the interior of said pipe and said chamber, annular flanges secured to said pipe providing annular orifices in said chamber and dividing said chamber into compartments, and means on said pipe for venting fluid therefrom to said chamber.

6. A surge damper including a central tube, a shell surrounding said tube and having its respective ends rigidly secured to said tube providing a chamber between the walls of said tube and said shell, annular flanges on said tube to provide annular orifices in said chamber, and a series of pipes on said tube providing communication between said tube and said chamber.

7. An hydraulic surge damper comprising an elongated shell, a conduit extending longitudinally through the shell, said shell having heads secured to said conduit, said conduit having a series of spaced ports arranged around the circumference of said conduit, means on said conduit providing annular orifices between said ports and dividing said shell into compartments, and vents in said conduit within said shell for the passage of fluid to the ends of said shell.

8. An hydraulic surge damper comprising an elongated shell, a conduit extending longitudinally through the shell, said shell having its respective ends secured to said conduit, said conduit having a plurality of pipes rigidly secured to and extending laterally therefrom providing communication between the interior of said conduit and said shell, and annular flanges on said conduit providing annular orifices in said shell.

9. An hydraulic surge damper comprising an elongated shell, a conduit extending longitudinally through the shell forming a chamber around said conduit, said shell having heads at its respective ends secured to said conduit, said conduit having one end reduced to form a throat within said chamber, annular flanges on said conduit dividing said shell into compartments and providing annular orifices along said shell, and a series of ports on said conduit providing communication between said conduit and said compartments.

10. An hydraulic surge damper comprising an elongated shell, a conduit extending longitudinally through the shell, said shell having heads at its respective ends secured to said conduit and providing a chamber between said conduit and said shell, said conduit having a plurality of pipes rigidly secured to and extending laterally therefrom providing communication between the interior of said conduit and said shell, and annular flanges on said conduit dividing said chamber into compartments and providing annular orifices in said shell for the passage of fluid from one compartment to another along said shell.

11. An hydraulic surge damper comprising an elongated shell, a conduit extending longitudinally through the shell forming a chamber around said conduit, said shell having heads at its respective ends secured to said conduit, said conduit having one end reduced to form a throat within said chamber, annular flanges on said conduit dividing said shell into compartments and providing annular orifices along said shell, a series of ports on said conduit providing communication between said conduit and said compartments, and vents at the respective ends of said conduit and in said throat for passage of fluid from said conduit to said chamber.

12. An hydraulic surge damper comprising an elongated shell, a conduit extending longitudinally through the shell, said shell having heads at its respective ends secured to said conduit and providing a chamber between said conduit and said shell, said conduit having a plurality of pipes rigidly secured to and extending laterally therefrom providing communication between the interior of said conduit and said shell, annular flanges on said conduit dividing said chamber into compartments and providing annular orifices in said shell for the passage of fluid from one compartment to another along said shell, and vents at the respective ends of said conduit and in said throat for passage of fluid from said conduit to said chamber.

EGON KOEHLER.